June 12, 1951 M. D. McFARLANE 2,556,970

SYNCHRONIZING SYSTEM

Filed Sept. 14, 1942 3 Sheets-Sheet 1

INVENTOR:

Maynard D. McFarlane

June 12, 1951 M. D. McFARLANE 2,556,970

SYNCHRONIZING SYSTEM

Filed Sept. 14, 1942 3 Sheets-Sheet 2

INVENTOR:

Maynard D. McFarlane

INVENTOR:

Maynard D. McFarlane

Patented June 12, 1951

2,556,970

UNITED STATES PATENT OFFICE 2,556,970

SYNCHRONIZING SYSTEM

Maynard D. McFarlane, Hollywood, Calif.

Application September 14, 1942, Serial No. 458,223

4 Claims. (Cl. 178—69.5)

This invention relates to improvements in the art of facsimile transmission and reproduction at one or more receiving stations of a facsimile or facsimiles of an original subject at a transmitting station. The improvements herein described comprise methods of and means for facilitating the synchronizing and framing or phasing of transmitting and receiving mechanisms adapted for use with facsimile systems. In addition, many novel features herein disclosed find application in allied arts, and the invention is not limited to use solely in a facsimile system as herein illustrated.

In a facsimile or picture transmission system, it is necessary to make a record of received signals, and to record these signals in correct spatial relationship not only with respect to each other but also with respect to the boundaries of the subject. An object of this invention is to secure this correct relationship of recorded signals, and particularly the correct "framing" of the received facsimile, that is, the correct disposition of the elements thereof with respect to the border or "frame."

In facsimile or picture transmission systems having moving members, this framing may be achieved by a correct phasing of the moving parts, and an object of this invention is to secure framing by such phasing. Where the members are rotating, angular phase displacement corresponding to the time of transmission may be utilized according to this invention to secure framing.

Phase adjustment may be secured by changing the speed of rotation of one mechanism with respect to another until a desired phase relationship is established. An object of this invention is therefore to provide a method of and means for changing the speed of a mechanism with respect to another in order to change a pre-existing phase relationship, and to continue the change in speed until a desired phase relationship is secured.

A further object of this invention is to utilize a transmitted signal at the start of a transmission for securing framing, and to use a tone signal therefor which is generated by the picture sending means.

Since phasing may be shown by comparison of transmitted and local signals, a still further object of the invention is to utilize a combination of transmitted and local signals for determination of a desired frame or phase relationship, and to secure such determination visually or automatically. Another object of my invention is to provide a novel method for automatic phasing of transmitter and receiver cylinders on a facsimile circuit, and means for carrying the same into effect. A further object of my invention is to provide means whereby manual phasing of transmitter and receiver cylinders may be readily accomplished.

An object of my invention is to provide the improved method of framing substantially as described. Other objects of my invention will be set forth in the specification and shown in the annexed drawings, in which certain forms of my invention have been described by way of example. The invention is not however limited to the specific examples herein shown, these being here described and illustrated for the purpose of explaining the invention.

In U. S. Patent No. 2,164,038, is described a method of synchronizing and framing applicable to facsimile transmission; according to this method signals are transmitted from the sending station to one or more receiving stations; and the received impulses are caused to control the starting and rotation of a receiving cylinder at each receiving station so that it shall start in phase and run in synchronism with the cylinder of the transmitting mechanism. While this system has proved entirely satisfactory over good communication circuits, it has been found in practice that certain of the channels over which it is desired to transmit facsimiles are susceptible to interference.

Interference with synchronizing impulses on a poor communication circuit may be avoided for example by use of local synchronization, such as by the use of frequency standards at each individual station; and by controlling both transmitters and receivers from the said standards in such a way that the speeds of rotation shall be constant within certain definite limits. In order that errors of synchronization may not be apparent in the received facsimile, commercial systems adopting this method utilize standards which are accurate to within one part in a million or better in order to achieve the necessary regulation. With such systems, auxiliary apparatus is necessary to secure framing, usually by securing a phase correspondence of rotating members such as picture drums or cylinders. By local synchronization is meant the use of a local standard, or a single or inter-connected alternating current power system, or the use of a separately transmitted frequency to effect the synchronization of the transmitting and receiving mechanisms by the use of synchronous machines operated by means independent of the signal communication circuit utilized for the transmission of the picture signal.

Thus, in the above mentioned patent is described a method of phasing the receiving cylinder with the transmitting cylinder which comprises a relay and latch mechanism for starting the rotation of the receiving cylinder when the first impulse of a train of synchronizing waves arrives at the receiving station from the transmitting station. When the auxiliary mechanism herein described is used in connection with this phasing apparatus, a method is provided whereby the incoming signal may be suitably amplified and caused to control the starting mechanism of the receiving cylinder; immediately thereafter the drive mechanism of the cylinder may be switched into operation. Thus, the first impulse of the train of impulses sent out from the transmitter mechanism may be employed as previously disclosed for the purpose of starting the receiving mechanism in correct phase with the transmitter; thereafter the rotation of the receiving cylinder may be controlled by the local frequency source.

Where the receiving mechanism is not so controlled for phasing, other methods of securing the correct framing may be employed. For example, in one such application a signal may be sent from the transmitter once for each revolution of the sending cylinder. This may be accomplished by a mechanical contact on the said cylinder, or by a suitably prepared portion of the transmitting cylinder which will cause a suitable signal to be sent out by a photo-electric cell. A convenient form of this may be an end portion with contrasting tone shades; such as a black mark on a white ring or a white mark on a black ring. At the receiving station the incoming phasing signal may be caused to operate an indicating device. Another indicating device may be operated, for example, by means of a mechanical contact on the receiving drum, and the phasing may be accomplished by controlling the speed of the receiving drum until the indications show that the two cylinders are substantially in phase. If desired, the above two indicating devices may be combined into one unit; as for example, by the use of a cathode ray tube.

In the case of a synchronous motor, as may be normally employed at the receiving station, a contact may be used to reduce the voltage applied to the motor in such a way that the motor drops out of synchronism, but still continues to rotate as an induction motor at a slightly lower speed. Thus an operator, watching the indications on one or more indicating devices, may bring the receiving cylinder into correct phase relationship with the transmitting cylinder by pressing for long or short periods on a phasing button which inserts a suitable resistance into the motor circuit. This phasing may also be accomplished automatically, the signals being caused, for example, to operate a relay which performs the desired function.

Previously known systems have incorporated clutches of various types between the receiving motor and the receiving cylinder; and mechanisms of this type have been found to be sources of trouble in the operation of a commercial picture transmission circuit. It is a feature of my invention that all this mechanism may be dispensed with; the receiving cylinder may be directly connected to the motor mechanism; and by means of the push-button or relay devices herein described, the phase relationship of the whole receiving motor mechanism may be adjusted to bring the receiving cylinder into correct phase relationship with the transmitting cylinder. A further advantage over previously known systems resides in my arrangement whereby all phasing adjustments may be made with transmitting and receiving mechanisms running; whereby a considerable saving may be effected.

The use of a picture frequency signal transmitted from the transmitting station to the receiving station for the purpose of phase adjustment, as here described, automatically adjusts the phase of the receiving cylinder to compensate for the delay characteristics of the communication channel at the picture frequency employed. On loaded circuits this delay characteristic may have an important effect on the phasing unless compensated for in this or a similar manner.

The accompanying drawings illustrate various modifications of control devices and phasing devices according to my invention. These drawings are illustrative of certain forms of the invention.

Figure 1:
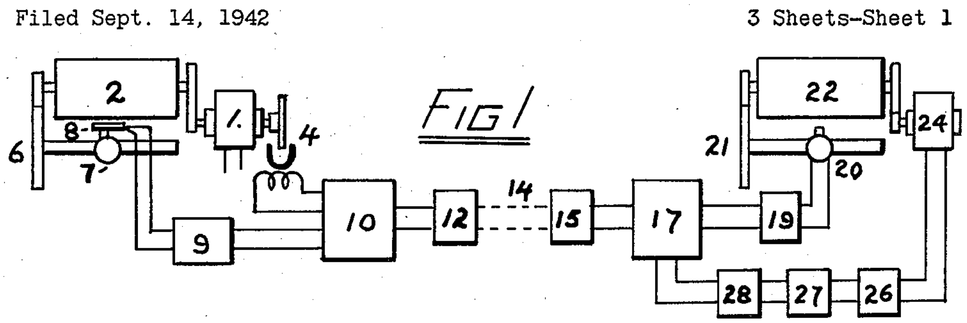
Figure 1 illustrates a facsimile system of a type employing transmitted synchronizing signals.

In Figure 1 a motor 1, suitably controlled as to speed, drives a cylinder 2 adapted to carry the original picture of facsimile; and also drives a generator 4 which may conveniently be of the phonic wheel type, thus incoming a synchronizing signal or signals into the coil 5.

The lead screw and mechanism 6 causes the scanning unit 7 to traverse the subject on the cylinder 2. The output of the photo-electric cell 8, which forms part of the scanning unit 7, is connected by leads (through a filter 9, if desired) to an amplifier 10.

The output of the coil 5 is also passed to the unit 10; in this amplifier 10 the two outputs may be mixed at their correct levels and amplified to any desired degree. The output of the amplifier 10, (consisting of two sets of signals, as desired) is passed to a coupling device 12. This coupling device may be of any desired type for applying the amplified signals to the communication channel.

The dotted lines 14 represent the communication channel between the transmitting station and the receiving station; this communication channel may be a wire network, a radio channel, or may consist of any other type of communication system which it is desired to employ between the transmitting and receiving stations. The type of communication channel employed has no bearing upon the devices herein described; the coupling devices 12 and 15 being of any type suitable to match the communication circuit employed.

At the receiving station a coupling device 15 may be employed to couple the receiving amplifier 17 to the communication channel. This amplifier 17 may be of any suitable type to raise the level of the received impulses to the desired level for the reproduction of the facsimile.

The output of the amplifier 17 is passed through the filter 19 to the recording unit 20. This recording unit 20 is caused to travel in a similar manner to the scanning unit 7 by means of the gear and lead screw apparatus 21, which may be similar to the gear and lead screw apparatus 6 at the transmitter. The receiving surface is mounted upon the cylinder 22, which is connected to and driven by the motor 24 through a reduction gear, if desired.

Power to drive the motor 24, or to control the speed of the motor 24 if this motor is of the double type, is supplied by the amplifier 26. This amplifier 26 is connected through the control device 27 and the filter 28 to the receiver amplifier 17.

From an examination of this figure, it can be seen that the motor 24 is driven by means of the circuits shown, including the pick-up coil 5, the various amplifiers and filters, and the control mechanism 27, in synchronism with the motor 1. The cylinder 22 on the receiver is therefore driven in synchronism with the cylinder 2 on the transmitter. The phasing device for securing correct phasing relationship between the cylinder 22 and the cylinder 2 have purposely been omitted from this drawing for purposes of clarification.

The device 27 may consist of a device which is capable of generating impulses to control the speed of the motor 24 at a frequency approximately that of the incoming synchronizing signals; and the device 27 may also be capable of being controlled by the said incoming signals so that it can be locked by the signals at their exact frequency. The apparatus 27 thereby becomes a controlled regenerative device. Alternatively, where the local synchronization is employed, the device indicated by the numeral 27 may be a switching and phasing device. In this event, the incoming signal may not be utilized to drive the motor 24, but may be used solely to control phasing of the receiving cylinder 22 with the transmitting cylinder 2.

Figure 2:
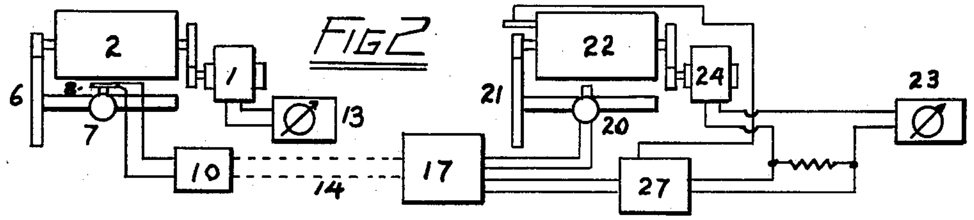
Figure 2 illustrates another facsimile system employing local synchronizing signals.

In Figure 2 is illustrated a similar facsimile system, in which the phonic wheel generator and the transmitted synchronizing signal have been replaced by sources of local frequency which are either of such standardization as to serve as independent synchronizing agencies, or are interconnected. In this figure, the motor 1 drives the cylinder 2 and by means of the mechanism 6 causes the photocell and associated apparatus 7 to traverse the cylinder and thus effect the scansion of the original subject on the cylinder 2. The photocell output is amplified by the unit 10, which may include such filters, equalizers etc. as may be deemed necessary, and applied in the form of a desired signal wave to the communication channel 14. The speed of the motor 1, and hence the speed of the mechanical unit, is controlled by the unit 13, which may be a tuning fork, an oscillator, or any other equipment suitable for carrying out the desired control. A similar unit is shown at 23, controlling the speed of the receiving motor 24. As above described, the units 13 and 23 may be replaced by a suitable form of interlocked frequency.

As shown in the figure, the signals in the channel 14 are amplified in the unit 17, which may include such filters and switching arrangements as may be required. The receiving cylinder 22, driven by the motor 24, drives the mechanism 21 to cause the optical unit 20 to scan the surface of the recording material on the cylinder 22. The unit 27, as above described, may be used to vary the speed of the motor 24 to effect a desired phasing of the cylinder 22 with respect to the cylinder 2 to secure a correct framing of the received facsimile.

Figures 3, 4, 5:
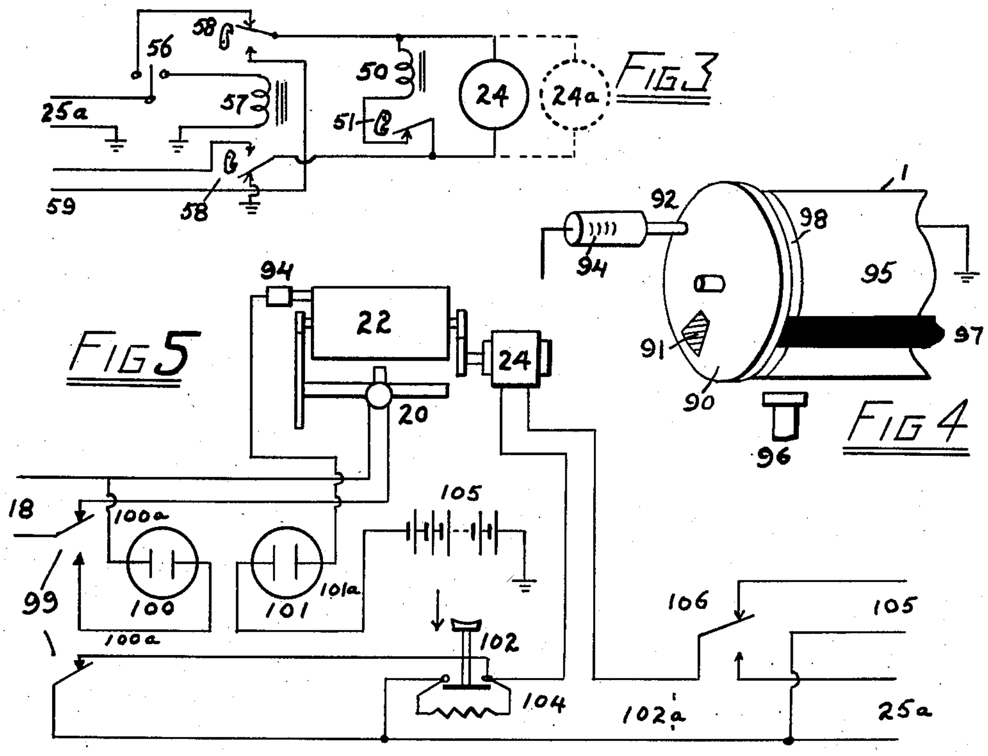
Figure 3 shows a method of phasing with local synchronization.
Figure 4 shows an end view of a cylinder mechanism.
Figure 5 shows schematically one form of a manual phasing device.

In Figure 3 is illustrated one arrangement by which a machine operated by an incoming synchronizing signal, as shown in Fig. 1, may be adapted for operation with local or power line synchronization as indicating synchronization over an A. C. power supply driven by an interlocked prime mover; this phase of the invention is not limited to the use of a power line as such. For example, certain circumstances exist in which it may be commercially feasible to transmit a synchronizing impulse over a separate channel; in that event, the method of synchronization will be the same as herein described for power line synchronization. As shown in the figure, a switch 56 applies the output of the amplifier 26 either directly to the motor 24, or to a relay 57. This relay 57 may conveniently be of the mechanically locking type, equipped with latches 58. The cylinder 22 is provided with a latch release mechanism as described in Patent No. 2,164,038; this latch mechanism is illustrated by the latch 51. This latch is dropped by the operation of the armature of the relay 50; the operation of this armature serving to cut the relay 50 out of the circuit and to close the ground return circuit of the motor 24.

With the switch in its left-hand position, the signal is applied through the back contacts of the relay 57 to the relay 50 and the motor 24. When the switch 56 is thrown to its right-hand position, the first impulse received on the circuit operates the relay 57, and by means of the front contacts of the armatures of this relay, current from a source 59 is applied to the starting relay 50 and motor 24. Since on the operation of the relay 57 the latches 58 lock the relay in an operated position, and since the relay 50 is cut out of circuit and held out by its latch 51 on the first impulse, the motor 24 will continue to rotate with power supplied through the leads 59. Where a common power supply is utilized, as discussed above, the leads 59 may be from the alternating current source; where a separate channel is provided having a continuous frequency imposed thereon, the leads 59 may be suitably connected to said separate channel through, for example, an amplifier; where local primary standards are employed, the leads 59 may be suitably connected thereto.

Thus in operation under this system, when local synchronization is to be used, the receiving operator throws the switch 56 to its right-hand position. The transmitting operator starts his machine in the normal manner, but after say one second of operation he may throw off his synchronizing switch and cease the transmission of synchronizing impulses. By this time the relay 57 will have locked itself in an operated position, and the train of synchronizing impulses is no longer required.

The absence of the synchronizing signals on the circuit during the transmission of a picture simplifies the filtering systems required in the receiver. Since in this case the synchronizing impulse is only applied for a very short period of time, this impulse may be made as strong as the communication channel will permit; and its inter-action with the picture signal may be neglected in view of the fact that the transmitting operator cuts the synchronizing signal out virtually at the start of the transmission.

In the above-mentioned Patent No. 2,164,038, has been described a contact mechanism on a transmitting cylinder whereby a circuit is closed once for every revolution of the cylinder, at a predetermined point in the revolution. Figure 4 illustrates another form of this mechanism, in which a cylinder 1 or 22 may be provided with an insulating end plate 90 having a conducting insert 91. Cooperating with this insert 91 is the brush 92 in the brush holder 94. Alternatively, if desired, the insert 91 may be of insulating material in a conducting end plate 90. In the first case, an impulse of short duration is sent out once each revolution of the cylinder; in the second case, an impulse is sent out which has one short break per revolution of the cylinder.

In this figure is also shown the method of obtaining a phasing signal through the photo-electric cell circuit. The original picture to be transmitted is illustrated at 95, and 96 represents the end of the scanning optical system carrying the photo-electric cell. 97 represents the holding bar fastening the original 95 to the cylinder.

When the optical unit 96 is in its extreme left-hand position as here shown, the spot of light will impinge upon the space 98, which may be clear metal, or may be the white edge of a photographic print or other subject 95. The bar 97 may be conveniently blackened, so that as the cylinder rotates the scanning unit 96 will read white except for the short period of time during which the end of the bar 97 passes in front of the photo-electric cell. Thus there is sent out, in this position, a picture signal consisting of a full strength signal interrupted for a short period of time once per revolution of the cylinder. By a correct location of the parts 91, 94, and 97, the impulses in the picture circuit may be made to occur at the same instant as the contact between the segment 91 and the brush 92.

Figure 5 illustrates a receiver mechanism adapted for manual phasing. The latch relay mechanism 50 and 51 illustrated in Figure 3 is omitted from this receiver, and in place thereof the receiving cylinder 22 is equipped with a segment and brush mechanism as described in connection with Figure 4. A switch 99 is provided in the picture circuit leads 18 whereby the picture signal impulses may be diverted from the recording device 20. Two indicator devices, which may conveniently be neon flash lamps, 100 and 101 are provided. By means of the switch 99, the lamp 100 may be caused to flash once per revolution of the transmitting cylinder by the incoming signal; and by means of the battery 105 and cylinder contact mechanism as described in Figure 4, the lamp 101 may be caused to flash once per revolution of the receiving cylinder 22.

The receiving motor 24 may be energized either from the incoming signals or from a local power supply which may be under control of a primary standard or which may be a source of alternating current interlocked with the alternating power supply of the transmitter. A contact 102, across which is a resistor 104, is arranged in the circuit of one of the leads to the motor 24. By depressing the contact 102, the resistance 104 is placed in the motor circuit and the motor speed thereby reduced. The contact 102 therefore provides a manual method of phasing the cylinder 22 with the cylinder 2 of the transmitting mechanism. The device may be operated until the two lamps 100 and 101 flash in unison; it may then be released, and the cylinders will remain in phase. Conveniently, the switch 99 may have an extra contact as shown, which short circuits the resistor 104 when the switch is thrown so as to place the incoming signal upon the recording device 20. This extra contact prevents an accidental pressure on the contact 102 from throwing the mechanism out of synchronism and out of phase.

While Figure 5 has been described with reference to an incoming picture impulse generated by the passage of the bar 97 in front of the scanning unit 96, it is obvious that any desired recurrent signal may be sent out from the transmitter by means of the segment 91 and brush 92 to the receiver, where this recurrent signal may be caused to operate the lamp 100 for phasing purposes. Also, while the operation of this phasing system has been described and illustrated with the two neon flash lamps 100 and 101, it is clear that many other devices may be used for achieving the desired result. A single lamp may be used in place of the two lamps shown; or any other suitable devices or device may be employed for indicating the phase relationship between the receiving and transmitting cylinders without departure from the spirit of my invention. For example, the two signals may be applied to the pairs of plates of a cathode ray tube, and the phasing of the cylinders may then be effected in accordance with the luminous trace in said tube. Many other alternatives are available, and my invention is not therefore limited to the specific examples shown and described.

In Figure 5 the leads to the lamp 100 are indicated at 100*a*, and to the lamp 101 at 101*a*, and to the contact 102 at 102*a*. These numerals are repeated in Figures 6 and 7 to illustrate how these two figures may be used to insert alternative apparatus in the circuit of Figure 5.

Figure 6:
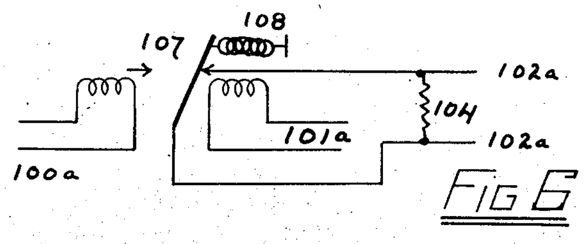
Figure 6 illustrates a relay circuit which may be used in the circuit of Figure 4.

In Figure 6, a double winding relay 107 is arranged so that its armature performs the function of the contact 102; the two coils are energized by the leads 100*a* and 101*a*, so that when signals are received in unison in these two circuits (corresponding to correct phasing of the receiving cylinder), the armature of the relay 107 will be held against a contact by the spring 108 so that the resistor 104 will be short-circuited, and the motor 24 will receive its full voltage. Should, however, the impulses in the coils connected to 100*a* and 101*a* be out of phase with each other, the armature of the relay 107 will be drawn away from the contact so that the resistor 104 will serve to slow the motor 24 until the machines are in phase and the impulses arrive in the circuits 100*a* and 101*a* at substantially the same time.

Figure 7:
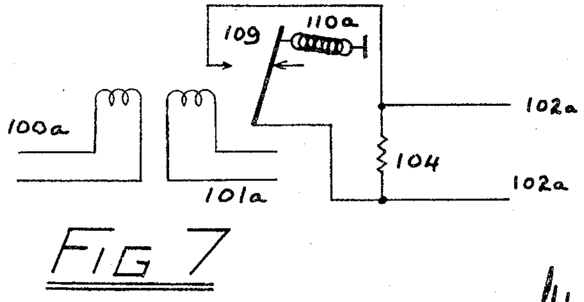
Figure 7 shows another phasing relay circuit.

Figure 7 is similar to Figure 6, except that the circuit therein shown may be adapted for operation in the case in which one of the phasing impulses consists of a long signal with a short break therein, such as may be obtained either from a photo-electric cell circuit as previously described, or by the use of an insulating insert 91 in a conducting disc 90 at either the transmitting or receiving station. The coils of the relay 109 connected to the leads 100a and 101a may be arranged to be mutually aiding; when the currents in the coils correspond to correct phasing of the cylinders, the net result will be that of a continuous load on the armature of the relay 109, thus closing it against the spring 110 and short-circuiting the resistor 104. When the cylinders are out of phase, the current through one of the coils will not occur at the time of the break in the current in the other of the coils, and therefore there will be periods at which the circuit of the relay 109 is opened to insert the resistor 104 in the motor circuit. This action will continue until the signals arrive in correct phase relationship, at which time no further correcting impulses will be applied to the receiver motor circuit.

It is to be understood that the above phasing system, as well as the manual phasing system described above and illustrated in Figure 5, relate to operation with local or transmitted synchronizing signals. This phasing system requires that the speed of a receiving mechanism be varied until correct phase relationship is established between this receiving mechanism and a transmitting mechanism; this condition being determined by the above described phasing signals. A system has been described for use with synchronous motors, and a method has been shown whereby a receiving motor may be dropped out of synchronism manually or automatically until the desired phase relationship is established: however, if a controlled regenerative device (and transmitted synchronizing signals) be used with a method of phasing described in connection with Figures 5 to 7, it is not necessary for the receiving motor to be pulled out of synchronism. A change in the frequency of the regenerative device may be employed to speed up or slow down the receiving motor, while said motor is running synchronously with the frequency applied to it.

For example, where an oscillator circuit is employed, means may be provided whereby the frequency of the oscillator may be increased or decreased so that the synchronous speed of a receiving motor may be changed for purposes of phasing. This change in speed may be accomplished by a switch mechanism which may change the tuning of the oscillator circuit so as to secure the speed variation. The operation of this switch may be manually controlled in conjunction with phasing lamps 100 and 101; or it may be conveniently performed by a relay such as 107 or 109 as described in connection with Figures 6 and 7.

Figure 8:
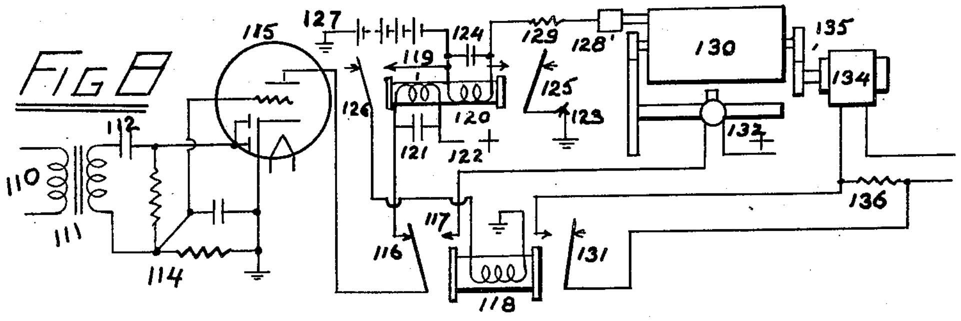
Figure 8 shows diagrammatically a transmitted signal-controlled phasing circuit.

In the arrangement of parts shown in Figure 8, the incoming signals on the line 110 are passed through the transformer 111 and condenser 112 to the network 114 and the tube 115. This network and tube are so arranged that the incoming signals are rectified and amplified, so that the output of the tube circuit in the plate lead thereof comprises an inverted rectified signal envelope of the incoming signals in the line 110. For example, when for purposes of framing or phasing a picture transmission system, signals corresponding to the passage of a black bar in front of a photoelectric scanning member (or to the absence of picture signals occasioned by the passage of such a bar) are produced in the input circuit 110 of the transformer 111, the corresponding output from the tube 115 may be in the form of an approximate square wave pulse interrupting the flow of plate current in the tube, or in other words, the plate current of the tube 115 is approximately cut off for a period corresponding to the period of the white signal at the transmitter and conducting for the time of the passage of the black bar in front of the scanning photoelectric cell. It is to be understood that the production of the signal is not limited to the passage of a black bar on a white surface under scansion: this particular device is used for the purpose of explaining the operation of the device, and because it is in practice a convenient method of obtaining the desired result: if desired, a cam interrupter serving to interrupt the output from an oscillator, or an insulating segment in part of the rotating mechanism may be employed instead of the scanning system described. The photoelectric scanning means is a preferred form of the device.

The circuit from the plate of the tube 115 passes by means of the back contact 116 of the relay 118 to the coil 119 of the relay 124, and thence to the supply of positive power 122. A condenser 121 may be placed, as shown, across the coil 119 as a by-pass for any residual alternating current in the output of the tube 115.

Another coil 120 of the relay 124 may be arranged as shown to be energized intermittently by means of current from a battery 127 passed through the coil 120, the resistance 129 and brush mechanism 128 to the cylinder 130, so that the coil 120 receives current when there is contact between the brush 128 and a conducting portion of the cylinder 130. In the manner previously described, this contact is arranged so that current is passed at the moment when the recording device 132 is in correct phase relationship with the scanning mechanism at the transmitter. In other words, if the framing impulse is sent out from the transmitter at the time of passage of the overlap or join of the original, as by means of the holding bar, then the brush 128 is arranged to make contact at the time that the overlap or join of the receiving surface is in front of the recording device 132.

As has been described in connection with Fig. 7 above, the relay 124 may be so arranged that current through either of the coils 119 or 120 is insufficient to operate the armature or armatures of the relay, but that when current is passed through both coils 119 and 120, the relay is itself operated. Thus the relay is only operated when current is passed simultaneously through both windings 119 and 120, that is, the relay is only operated when the desired phase relationship is achieved, as evidenced by the arrival of the currents in both coils at the same time.

The operation of the relay causes the closing of the contact 125, which passes current from the battery 124 through the coil 120. Since in the circuit including the brush 128 there is the series resistance 129, and since there is no resistance shown in the circuit through the contact 125, the values of the currents may be so balanced that current through the coil 120 and the contact 125 is sufficient to hold the relay in its operated position, while the insertion of the resistance 129 in the other leg allows the requirement to be met that the relay shall be operated only when there is current in both coils. Thus the contact 125 serves as a locking contact, and the relay remains locked in its operated position once it has been operated until the circuit is broken by the switch 123.

Through the contact 126 the relay 124 causes the operation of the relay 118, and holds this relay operated as long as the relay 124 is locked up. Through the contact 117, this relay puts the incoming signals from the line 110 through the tube 115 to the recording device, which in this case may be a device suitable for operation on a rectified signal envelope, as a gas tube for example of the type known as Westinghouse WL 761. Through the contact 131 the relay 118, when operated as above described, short circuits the resistance 136 in the supply line of the motor 134 which drives the cylinder 130 through the gear train 135. This resistor may be arranged, as above described, to cause the motor 134 to run below its synchronous speed when the resistor is in series with the motor.

It may thus be seen that the receiving mechanism is being driven at a speed below the speed of the transmitter until the relay 118 is operated; so that the resistor 136 in the motor circuit serves to produce a speed variation which will cause the phase of the two mechanisms to shift continuously until the desired phase relation is established, as evidenced by the operation of the relay 124, at which time the resistance 136 is cut out of circuit, and the motor 134 is caused to run at its synchronous speed in both synchronism and phase with the motor at the transmitter.

Figure 9:
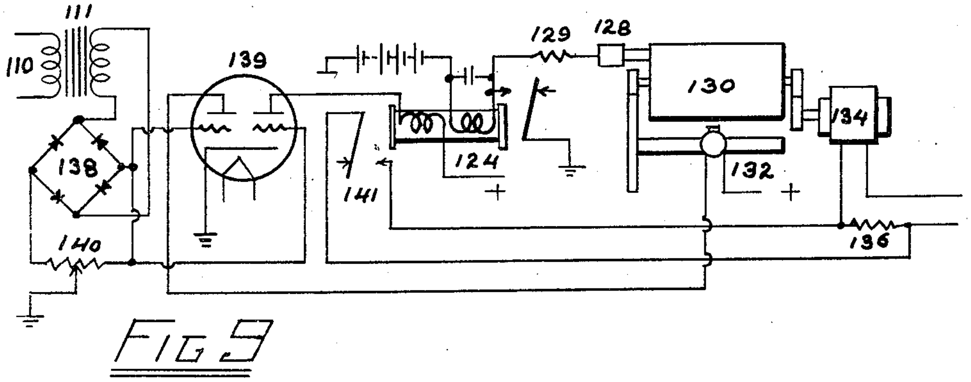
Figure 9 shows another phasing circuit adapted for use with picture signals.

Figure 9 illustrates a similar arrangement, except that the network 114 is replaced by the rectifier 138, which applies its output to the tube 139, which is here shown as a double triode, of a type known as a 6N7. As shown, the rectifier 138 passes negative potentials to the grids of the tube 139 in accordance with the adjustment of the potentiometer 140. One triode of the double tube 139 is arranged to apply picture signals to the receiving device 132, while the other triode applies signals to the relay 124 as above described. Except that the relay 118 has been omitted, and its function performed by the contacts 141 of the relay 124, the operation of the circuit shown is similar to that above described in connection with Fig. 8; and control of the motor 134 is under the control (as relates to phasing) of the tube 139 and the relay: the phasing devices are no longer operative when correct or desired phase relationship has been secured.

Figure 10:
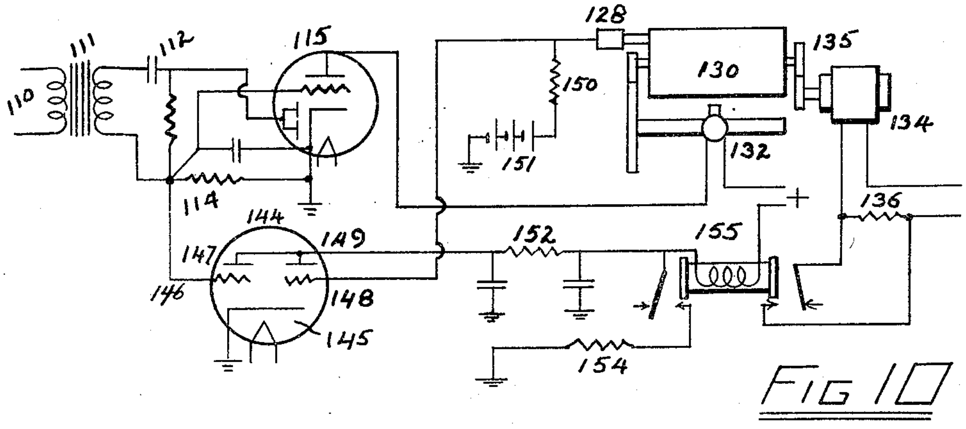
Figure 10 shows another form of phasing circuit.

In the arrangement shown in Figure 10, the input circuit from the line 110 through the transformer 111, condenser 112, network 114, and tube 115 is similar to that shown in Fig. 8. This Fig. 10, however, illustrates a tube arrangement for carrying into effect the summation of the currents with respect to time from the local and distant machines. As illustrated, this function is performed in the tube 144, which may be of the type 6N7 or any other suitable tube. It is to be noted that, while I have here illustrated a single tube at the point 144, the purposes of this tube may be carried into effect by a plurality of tubes, and the invention is not limited to the particular arrangement here shown and described.

As shown the tube 144 receives its positive anode supply through the winding of the relay 155, through the network 152. The purpose of this network 152 is to filter and smooth out the current pulses applied to the relay 155; however, with certain types of apparatus this network 152 may be omitted without detriment to the operation of the apparatus. In the figure the cathode 145 is shown grounded, and the two anodes 147 and 149 are shown tied together and connected as above stated to the anode supply through the network 152 and the relay winding 155. The grid 146 of the tube 144 is shown connected to a point on the network 114 such that the negative bias of the grid is proportional to the signal intensity, so that the anode current due to the plate 147 is inversely proportional to the signal intensity, or in other words, inversely proportional to the picture density. Thus a black portion of the picture will cause a larger current flow through the tube 144 than that due to a white portion, and the passage of a black holding bar before a photoelectric cell otherwise scanning a white strip will produce a positive current pulse through the network 152 and the winding of the relay 155.

As has been above described, this relay 155 is so arranged that the pulse of this nature does not produce sufficient electro-magnetic energy to operate the relay and attract the armature or armatures, so that the single pulse or succession of pulses from the line through the network 114 and left-hand section of the tube 144 will not operate the relay 155.

The right-hand section of this tube is shown with its plate 149 connected to the plate 147 of the other section, and its grid 148 connected through the resistor 150 to the negative terminal of the battery 151, whose positive terminal is grounded: thus a negative bias is applied to the grid 148. Also connected to the grid is the brush 128, which is arranged as previously described to make contact with the grounded cylinder 130 at the appropriate portion of its revolution, that is, to make contact when the loading bar is in front of the recording member 132. This corresponds to the passage of the loading bar in front of the photoelectric cell at the transmitter, and when these two traverses occur simultaneously, the cylinders are in phase.

It may be readily seen that both the incoming phasing signal of the type above described, and the passage of the brush 128 over the appropriate segment on the cylinder 130, produce grid potentials tending to increase the plate currents in the tube 144. Since the two plates are shown strapped together (in practice a damping resistor of a small value may be inserted in each plate lead to suppress parasitics) it is clear that simultaneous arrival of both signals on the grids will have the effect of almost doubling the plate current flowing from the battery through the winding of the relay 155. As has been above described, this relay may be adjusted to operate on this increased value of current, and to remain inoperative on the value of current represented by one section of the tube becoming conducting by the signal introduced to the appropriate grid or by the grounding of a grid. As a numerical example, let it be considered that the current passed by the left hand section of the tube under condition of high negative signal, corresponding as above shown to a white portion of the picture, be adjusted by a suitable arrangement of constants to be 1 milliampere, and that the said section of the tube 144 passes 10 milliamperes when the signal intensity is reduced to the black level, as by the passage of the holding bar in front of the scanning system at the transmitter. Similarly, the battery 151 and resistance 150 may be adjusted so that the current produced when the brush 128 is not making contact as 1 milliampere, and when the brush does make contact the current through the right-hand section is increased to 10 milliamperes. Under these circumstances the current flowing through the relay winding, being the sum of the currents in the two portions of the tube 144, is:

| | Ma. |
|---|---|
| White signal, no contact | 2 |
| Black signal, no contact | 11 |
| White signal, contact | 11 |
| Black signal, contact | 20 |

This last condition corresponds, as described above, to the position of correct framing, or phase relationship which it was desired to achieve. Since this condition exists when the relay current is 9 ma. above the current condition for any other combination, and since this represents a current increase of 80%, it is clear that the relay may be set to operate on this difference in current, and hence to operate only when both remote and local phasing impulses are received simultaneously.

The operation of the relay 155 serves to lock itself in an operated position by the contact shown on the left, and the resistance 154 to ground, and also to short-circuit the resistor 136 in series with the motor 134 and allow this motor to assume its synchronous speed and drive the cylinder 130 through the chain of gears 135 in synchronism and phase with the transmitter mechanism. Picture signals from the incoming line 110 are applied through the transformer 111 and tube 115 to the recording element 132, and thus serve to reproduce a facsimile of the original subject at the transmitter on the surface of cylinder 130.

While there has been here illustrated a circuit in which the incoming and local phasing signals are operative when in phase with each other, it is to be understood that similar arrangements and circuits may be made to cause desired phasing by other devices, as for example by having both sections of the tube 144 arranged so as to pass current except during the arrival of the phasing signals (transmitted and local), and arranging the relay 155 to drop out on correspondence instead of pull up as described above.

The operation of the system disclosed in this figure may be briefly described as follows: On applying current to the motor it runs as an induction motor, below its synchronous speed. Arrival of phasing signals (which may be caused by the passage of a dark strip, such as a holding bar, in front of a photoelectric cell otherwise scanning a white surface, or by any other suitable means) is timed with the relatively varying position of local signals by the tube 144, which is so arranged as to cause the speed-reducing resistor to be shorted out when correct phasing or framing is reached. The driving of both transmitting and receiving motors at synchronous speeds is achieved by means not forming part of this invention: and the recording of the facsimile, and the scansion of the original, may be performed by various means well known in the art.

Figure 11:
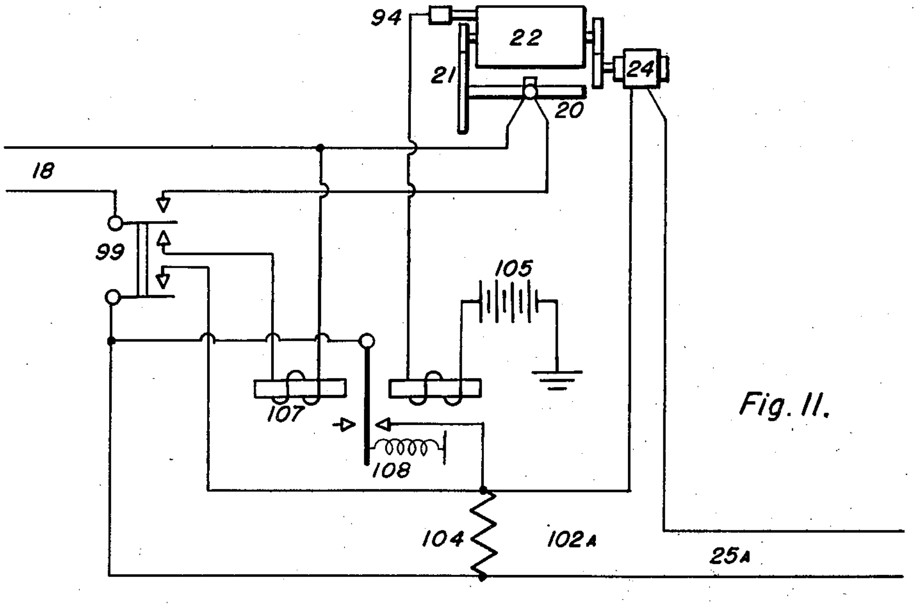
Figure 11 shows the device of Figure 5 modified in accordance with Figure 6.

Figure 11 illustrates the combination of the elements of Figures 5 and 6 referred to above: as described in this combination a relay is caused to perform the interruption of the motor circuit and to cause the by-pass resistor 104 to reduce the speed of the motor 24 below its synchronous speed. Thus the relay 107 performs the functions of the push-button 102 of Figure 5.

In the arrangement shown in Figure 11, the receiving drum 22 is driven by the motor 24 through the agency of the gearing 21. A brush in the brush holder 94 makes contact (as shown in Figure 4) at the instant that the join in the recording material passes in front of the recorder 20, known as the underlap period. The brush holder 94 is connected through the right hand winding of the relay 107 to the battery 105, the other terminal of which is connected to ground. Thus each time the brush holder 94 makes contact with a conducting portion of the drum 22 the right hand coil of the relay 107 is energised.

The motor 24 receives power from the leads 25*a*, either via the resistance 104 or directly through the contact of the relay 107 or a contact of the switch 99. When the motor receives the full value of the voltage in the leads 25*a* it runs in synchronism with its power source: the value of the resistor 104 is so adjusted as to cause the motor to run as an induction motor at a speed below its synchronous speed.

Incoming signals from the transmitter, suitably amplified, are applied to the leads 18. The switch 99 serves to apply the incoming signals to the recording unit 20 when the picture is being received, or to the left-hand winding of the relay 107 during the phase adjusting period. The lower blade of the switch 99 serves to short-circuit the resistor 104 when the switch is in the recording position, so that while recording the resistor 104 is effectively prevented from throwing the motor 24 out of synchronism. The switch also cuts out the relay 107 while in the recording position so as to concentrate the picture energy received via the circuit 18 on the recorder 20.

During the phase-adjusting period, when the switch 99 is thrown so as to apply the incoming signals to the relay 107 and to render the action of the relay armature effective in reducing the motor speed, it is apparent that the spring 108 tends to keep the relay armature on its right-hand contact, thereby allowing the motor to run synchronously. The arrival of an energising signal from the transmitter through the leads 18 will swing the armature to the left for the duration of the signal impulse, thereby slowing the motor 24, unless at the same time the other relay coil is energised through the brush in the brush-holder 94. Thus, when the local impulse from the battery 105 is applied to the relay 107 at the same instant as the incoming signal from the transmitter, the relay is unaffected by the signals, and the motor speed is unchanged. Since this simultaneous arrival of the signals at the relay 107 corresponds to the condition of correct phasing of the receiver drum with the transmitter drum, when this condition is achieved the phase-adjusting period is completed.

Figure 12:
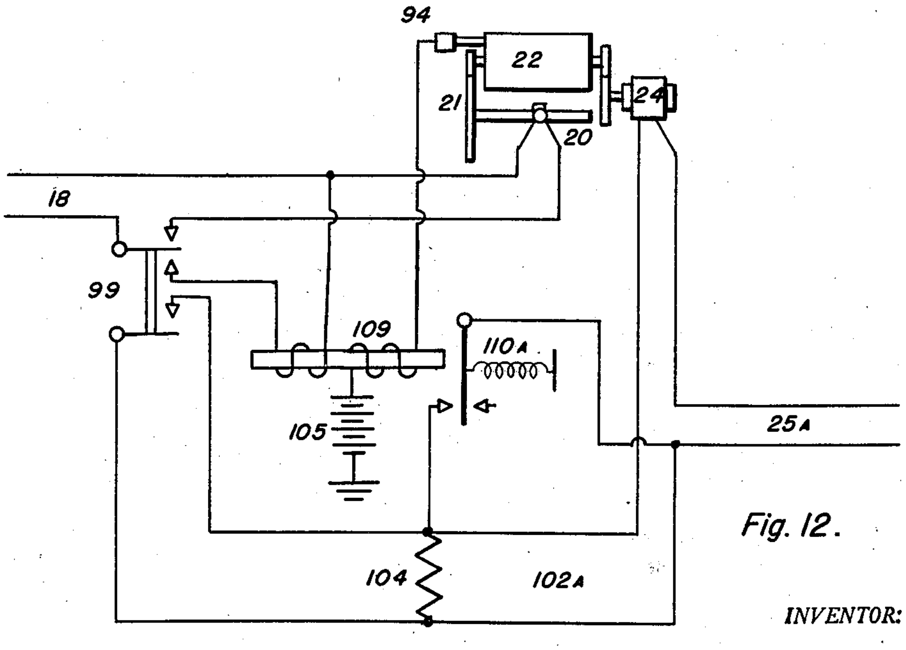
Figure 12 shows the device of Figure 5 modified in accordance with Figure 7.

Figure 12 illustrates a similar arrangement of the elements of Figures 5 and 7. In this case the contact segment on which the brush in the holder 94 rides is arranged to make contact for all of the revolution except the portion comprising the underlap section. The spring 110*a* normally holds the armature of the relay 109 away from its active (left hand) contact; but the current from the battery 105 through the circuit including the holder 94 is arranged to energise the relay 109 and draw the armature onto the left-hand contact; this is effective except for the underlap period, and therefore the motor 24 is continued in synchronous rotation except during this period.

The other winding of the relay 109 is energised (through the switch 99) by incoming signals from the line 18. When these signals arrive at the relay 109 at the time during which the current from the battery 105 is interrupted in the other relay winding, the relay armature will be held in its operated position during this period, and the motor will continue to operate synchronously: the condition of phase correspondence having been achieved. As in the previously described circuits, the switch 99 serves to selectively apply the incoming signals to the recording unit 20 or the relay 109, and when the recording unit is in circuit, to lock out the relay 109 by bridging the resistor 104.

This application comprises in part a refiling of application Serial No. 173,375, filed November 8, 1937, now abandoned.

Where in the specification and in the appended claims I refer to phasing or framing in relation to facsimile transmission, it is to be understood that reference is made to that function of successful transmission and reception which requires that the borders of the received facsimile shall correspond with the borders of the original subject. And where I use the term "facsimile" it is to be understood that reference is made to include all such forms of picture transmission and reception systems, whether the subject matter to be transmitted and received be in the form of photographs, writing, printing, drawings, sketches, typescript, or other similar matter.

Having now described my invention, I claim:

1. In a system for the transmission of pictures and the like, the method of securing proper phase relationship between instruments at separated points which comprises driving the mechanisms in substantial synchronism, transmitting from one station a signal indicative of the phasing of the mechanism at that station, receiving said signal at a second station and there producing a visual indication therefrom, producing a visual signal indicative of the phase of the mechanism at the receiving point, comparing the time of appearance of said signals, changing the speed of one of said mechanisms (if necessary) to secure an indication of desired phase relationship between said mechanisms, and after the establishment of the desired phase relationship preventing further speed change.

2. In a system for the transmission of pictures or the like the method of phasing transmitting and receiving mechanisms which is characterized by transmitting a signal to a receiver during the underlap period of scansion, receiving said signal and producing a visual signal therefrom, producing a visual signal corresponding to the underlap period of the receiver, comparing said signals in time relationship, producing non-synchronous operation of the normally synchronous receiver until the signals occupy a predetermined time relationship, restoring synchronous operation and subsequently precluding non-synchronous operation.

3. In a facsimile receiving mechanism, means to receive a phasing signal and apply it to a relay, means to apply a local signal to said relay, said local signal being operative to prevent actuation of said relay by said received signal at a time of desired phase relationship of the receiving mechanism with a transmitting mechanism, and means under control of said relay for effecting phase change by a change of speed.

4. A device as claimed in claim 3 in which the speed change means is locked out of the circuit upon completion of phase adjustment.

MAYNARD D. McFARLANE.

REFERENCES CITED

The following references are of record in the file of this patent:

UNITED STATES PATENTS

| Number | Name | Date |
|---|---|---|
| 2,111,153 | Nichols | Mar. 15, 1938 |
| 2,182,000 | Nichols | Dec. 5, 1939 |
| 2,230,822 | Artzt | Feb. 4, 1941 |
| 2,239,489 | Hogan et al. | Apr. 22, 1941 |
| 2,246,284 | Artzt | June 17, 1941 |
| 2,256,364 | Thompson | Sept. 16, 1941 |